United States Patent [19]

Parsons et al.

[11] Patent Number: 5,594,522
[45] Date of Patent: Jan. 14, 1997

[54] CASSETTE FOR ENCLOSING A PLURALITY OF NEGATIVE FILM UNITS

[75] Inventors: Harry R. Parsons, Reading; Robert M. Curry, Arlington, both of Mass.; Stephen G. Gilvar, Bedford, N.H.

[73] Assignee: Polaroid Corporation, Cambridge, Mass.

[21] Appl. No.: 312,420

[22] Filed: Sep. 26, 1994

[51] Int. Cl.$^6$ ............................................ G03B 17/26
[52] U.S. Cl. .......................................... 396/517; 396/524
[58] Field of Search ............................... 354/83, 276, 283

[56] References Cited

U.S. PATENT DOCUMENTS

| | | | |
|---|---|---|---|
| H37 | 3/1986 | Schettino . | |
| 3,545,357 | 12/1970 | Erlichman et al. | 95/13 |
| 3,607,283 | 9/1971 | Gold . | |
| 4,226,519 | 10/1980 | Gervais et al. | 354/174 |
| 4,283,134 | 8/1981 | Columbus | 354/275 |
| 4,324,473 | 4/1982 | Coughlan | 354/276 |
| 4,392,731 | 7/1983 | Van Heyningen | 354/180 |
| 4,688,912 | 8/1987 | Johnson et al. | 354/86 |
| 4,804,988 | 2/1989 | Hashimoto et al. | 354/276 |
| 4,823,154 | 4/1989 | Sturgis | 354/86 |
| 4,972,218 | 11/1990 | Weissburg | 354/276 |
| 5,292,612 | 3/1994 | Polizzotto et al. | 430/207 |
| 5,327,187 | 7/1994 | Slavitter | 354/275 |
| 5,345,289 | 9/1994 | Lippert | 354/283 |

OTHER PUBLICATIONS

Research Disclosure, No. 175, Nov. 1978, Havant GB, p. 56, G03B17/32.
K. Lee, Two–Chamber Film Cartridge, Figure 1.

*Primary Examiner*—David M. Gray
*Attorney, Agent, or Firm*—Leslie Payne

[57] ABSTRACT

This invention involves a film cassette for resiliently holding a film unit for exposure. The cassette includes a forward wall, a rear wall, two side walls, a leading end wall and a trailing end wall all combined to form an enclosure for holding the film unit. An exposure opening in the forward wall allows exposure of the film unit and an egress opening in the leading end wall allows it to be discharged after exposure. A pick slot in the forward wall provides access to a pick to engage the film unit and advance it through the egress opening. A spring platen mounted within the chamber between the rear wall and the film unit biases the film unit against the forward wall in proper position for exposure through the exposure opening.

23 Claims, 3 Drawing Sheets

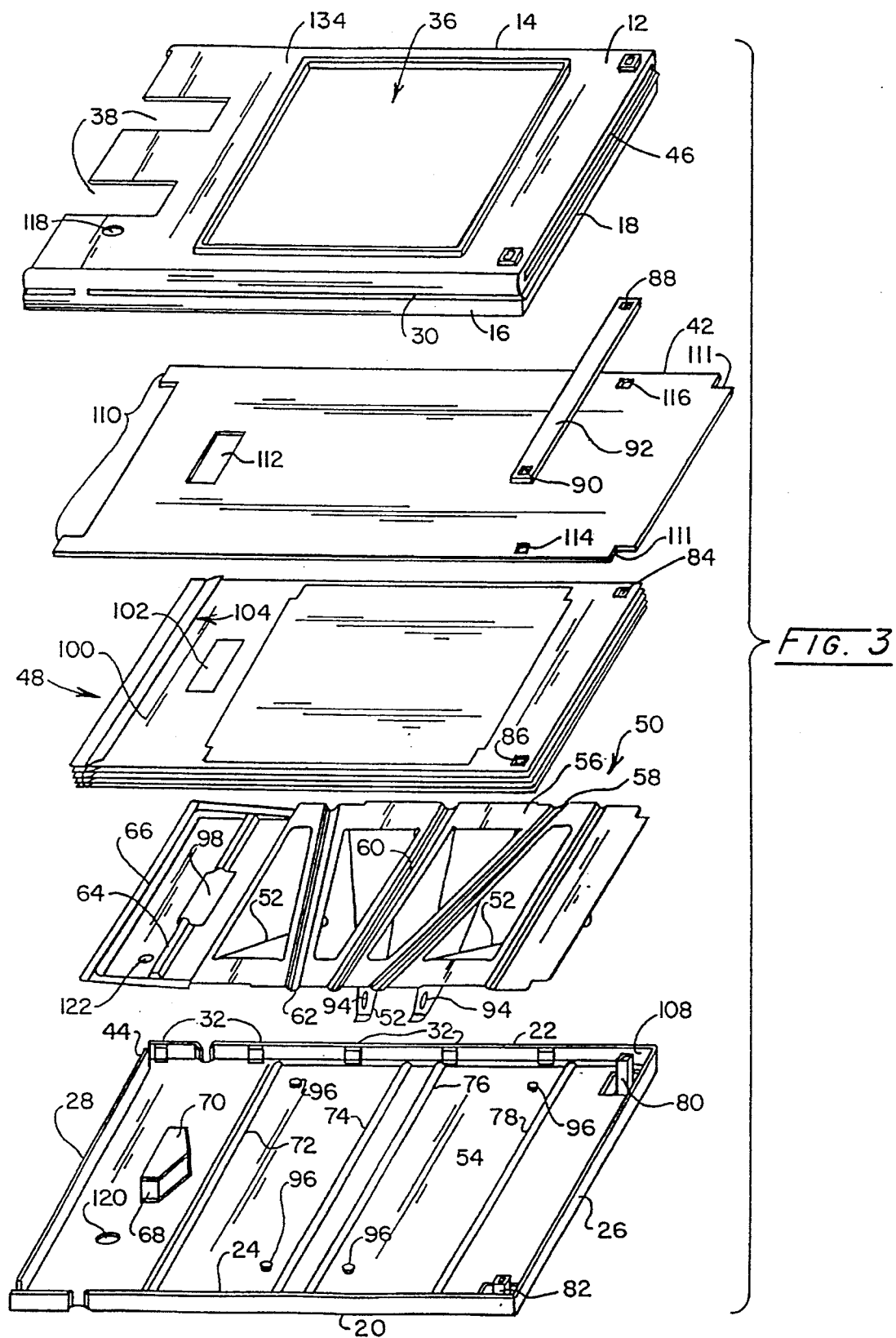

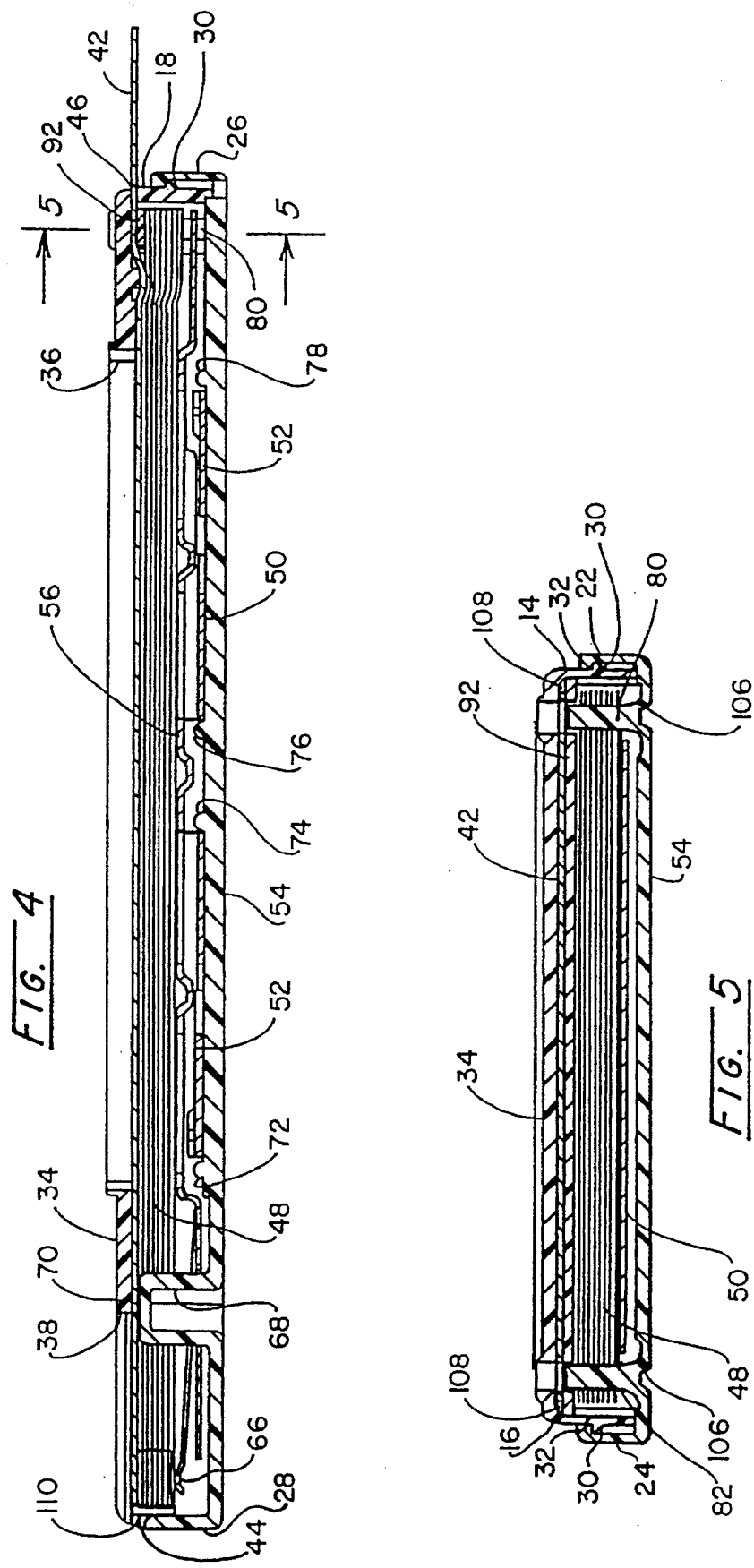

CASSETTE FOR ENCLOSING A PLURALITY OF NEGATIVE FILM UNITS

BACKGROUND OF THE INVENTION

1. Field of the Invention

This invention relates to a film cassette containing one or more negative film units. The cassette is inserted into a camera where the negative film units are exposed and subsequently expelled from the cassette.

2. Description of the Prior Art

Self-developing, peel-apart type film units are well known in the field of instant photography. Each film unit comprises a negative or photosensitive sheet for forming a negative image of a subject, an image-receiving layer for forming a positive subject image and a rupturable pod of processing liquid. A positive image is formed on the positive sheet by means of a well known diffusion transfer process after the pod containing the processing liquid is ruptured and its contents spread between the positive sheet and negative sheet on which a latent image has been formed.

Film units of the aforementioned type are typically exposed in portable, multiple exposure, instant-type photography cameras or processed individually in large format film processing equipment. When employed as a composite (both positive and negative sheets) in a camera, as many as ten film units are provided in a single, light-tight film pack or cassette. The film units are mounted within the cassette in stacked relation with a positive sheet stack on one side and a negative sheet stack on the other side of a pressure plate located within the film cassette. The units are biased in sequence to a proper exposure position by the pressure plate.

The expense and inconvenience of a film cassette holding as few as ten composite film units in a single cassette is a problem. Heretofore, there has been no solution to this problem where instant photography is the goal of a hand-held camera. It has been determined that one way to reduce such expenses and improve convenience would be to limit the film in a film cassette to negative film sheets, only. This arrangement would allow a greater number of negative sheets to be stored within a single cassette over a comparable size cassette containing both positive and negative film sheets. In this regard it should be noted that, with conventional large format film or where on-site development is not necessary, the developing process may be completed outside the camera. This feature provides an opportunity to use the film cassette to contain a large number of negative film sheets and no positive film sheets, for example, 25 to 35 negative sheets in one cassette. The economic benefits of such an arrangement are obvious. After the negative film sheets are exposed in, for example, the large format environment, they are conventionally stored in a lighttight compartment, which may be a transfer cassette, where each exposure or a plurality of exposures are deposited in the transfer cassette and transported to a developing system to be developed by whatever process is appropriate.

In conventional peel-apart, self-developing type film, as is commonly used with certain Polaroid Corporation hand-held camera systems, each positive/negative film unit combination includes a pull-tab that is attached to the leading end thereof. The tab is pulled through a pair of conventional spread rolls by a camera operator, after film exposure, in order to initiate film processing. While effective for the manual processing of self-developing film, such a pull-tab arrangement is not a viable option in, for example, automated film processing apparatus.

Similarly, in conventional integral film of the self-developing type, such as that used with self-developing cameras sold by Polaroid Corporation under their registered trademark Spectra, each positive/negative film unit combination includes a framework between positive and negative film sheets. This two-sheet combination is sufficiently rigid as to allow the exposed film unit to be ejected by a conventional pick member, in the form a hook-like element, that engages the trailing end of the film unit. However, such means for ejection is not an available option when the film unit in the cassette is one of a plurality of thin negative sheets because a negative sheet, by itself, is not rigid enough to be moved longitudinally out of a cassette by the trailing end urging of a conventional pick.

Additionally, single sheets are relatively thin and may be dislodged or prematurely expelled from the light-tight cassette during impact from packaging, shipping, or dropping the cassette as it is unpackaged just prior to insertion into a camera. Maintaining the unexposed integrity of the negative film sheets is critically important to the production of a suitable, visible image on a positive film sheet, following development.

The thinness or flexibility of the negative film sheet creates another problem. The problem is how to obtain the proper orientation of the sheet within the cassette after its exposure so that it may be ejected through a properly located egress opening in the leading end wall of the cassette. Conventional composite structures of the instant developing type do not have this problem because of the relatively rigid frame located between the two sheets. Without the frame, the negative film unit is too flexible and the leading end may droop so as not to be properly oriented with the egress opening. Thus, unique support structure is required in cassettes enclosing unsupported negative film sheets.

SUMMARY OF THE INVENTION

This invention provides a solution to these problems by providing a negative film cassette suitable for mounting within a camera for sequential exposure. It may have 25 to 35 negative film units or sheets therein. The cassette is conventional in one context, in that, it forms an enclosure or compartment which provides a lighttight environment. The enclosure is formed by a forward wall, a rear wall, two sidewalls, a trailing end wall and a leading end wall. An egress opening at the leading end wall of the cassette is configured for the ejection of negative film units from the cassette after each is exposed.

The forward wall has an exposure opening which is initially covered in a lighttight condition by an opaque member or dark slide extending from the egress opening over the top of the negative film units and through a retraction slot in the trailing end wall of the cassette.

Because the thin and flexible negative film units are not sufficiently rigid as to allow a pick to expel it from the cassette when urged from the trailing end wall of the cassette, a leader is adhesively secured to the leading end of the negative film unit and is folded back on itself to form a pocket to receive an ejection pick. The ejection pick of this invention comprises a thin blade which enters the cassette through an opening in the forward wall between the exposure opening and the egress opening. The pick blade dips into the cassette through the slot in the forward wall and slides into the pocket formed by the folded leader on the leading end of the negative film sheet and ejects it into the bite of a pair of transfer rollers or other transfer devices to pull the trailing end of the negative film unit from the cassette.

A plurality of structural features are employed to minimize the possibility of premature ejection or misalignment of the negative film units within the cassette. They include a rigid location post projecting from the rear wall of the cassette through openings in each negative film unit and a pair of hold-back pins projecting from the rear wall of the cassette through openings in each film unit.

Objects, features and/or advantages of the present invention not understood from the above will be readily apparent from the following detailed description of the preferred embodiments thereof when taken in conjunction with the accompanying drawings.

BRIEF DESCRIPTION OF THE DRAWINGS

FIG. 3 is an exploded perspective view of the cassette of FIG. 1;

FIG. 4 is a sectional view taken along line 4—4 of FIG. 2; and

FIG. 5 is a sectional view taken along line 5—5 of FIG. 4.

DESCRIPTION OF THE PREFERRED EMBODIMENT

Figure 1:
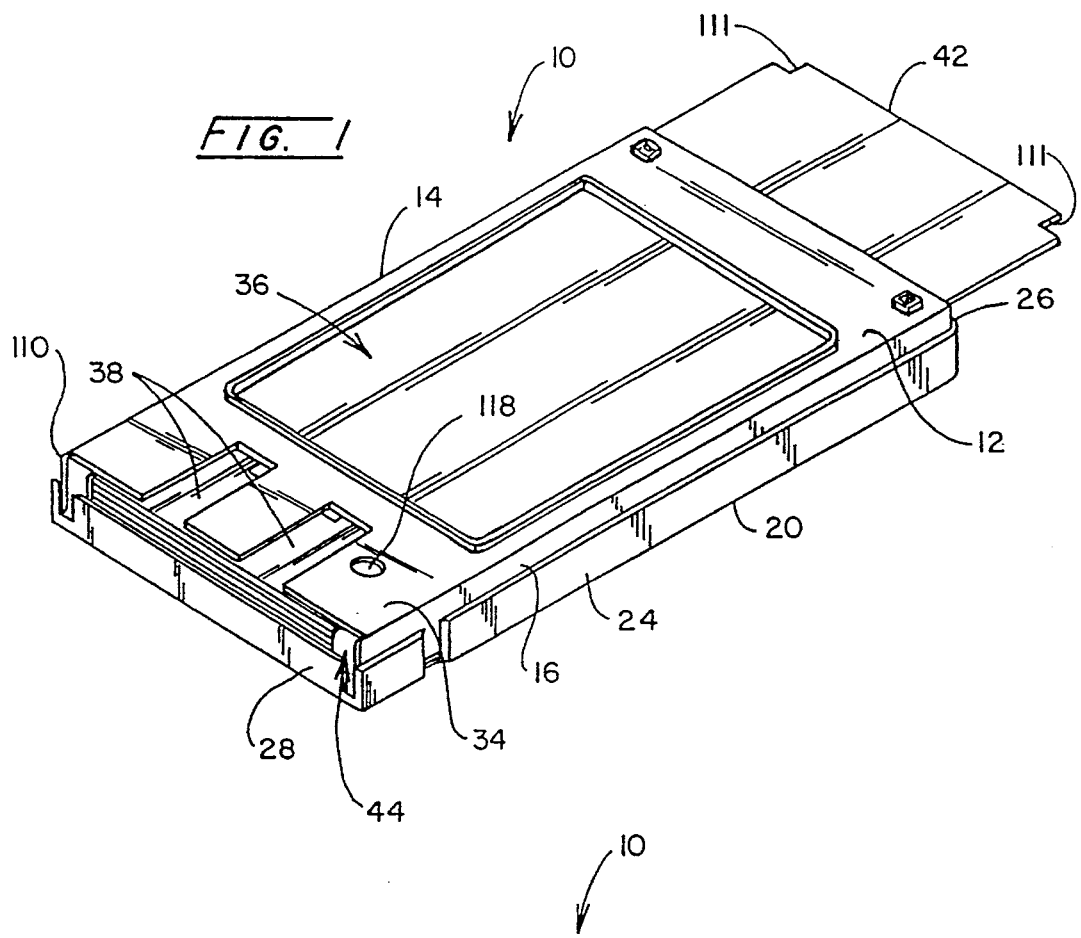
FIG. 1 is a perspective view of a film cassette according to this invention as it appears prior to insertion into a camera.
Figure 2:
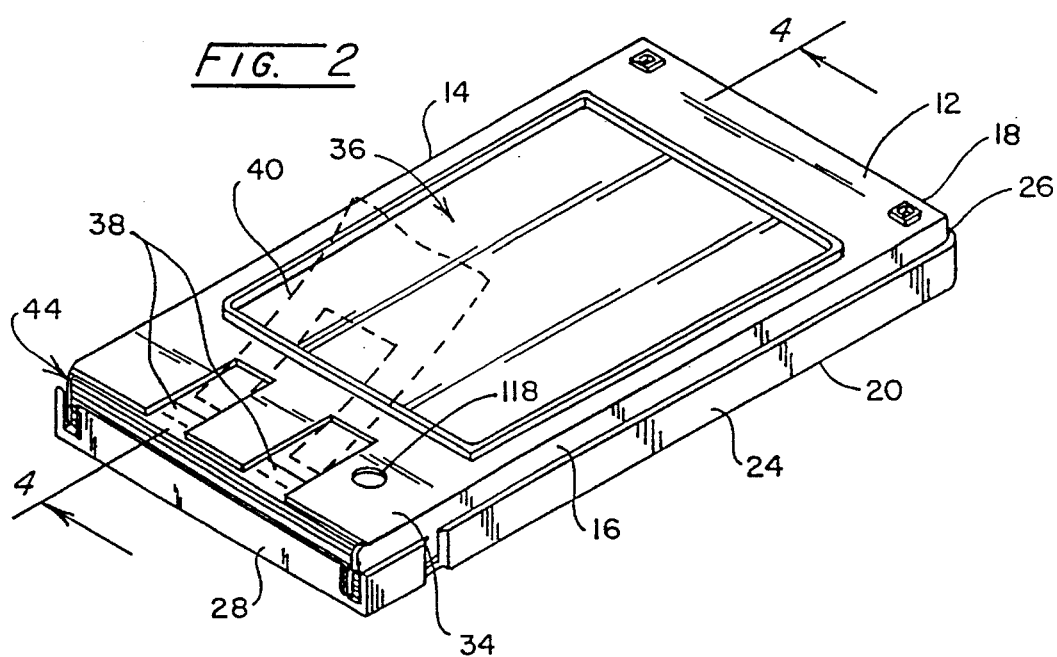
FIG. 2 is a perspective view of the cassette of FIG. 1 after it is inserted into a camera and with the dark slide removed.

Looking to FIGS. 1, 2 and 3, a cassette 10 according to this invention includes a forward wall or top cover 12 having tapered side walls 14 and 16 and a tapered trailing end wall 18.

Cover 12 is configured to slide into a locking relationship with a body 20. Body 20 also has sloping side walls 22 and 24, a trailing end wall 26, and a leading end wall 28.

A number of equivalent structures may be used to secure the cover 12 and body 20 together. The illustrated and preferred structure comprises a sloping ridge 30 extending around the side walls 14, 16 and trailing end wall 18 of the cover 12 which slide past locking hooks 32 on the side walls 20, 22 and the trailing end wall 26 of the body 20. As best seen in FIGS. 1 and 2, the cover 12 snaps into place as its side walls and trailing end wall slide inside the side walls and trailing end wall of the body 20.

Top cover 12 forms a forward wall 34 for the cassette 10 and it includes an exposure opening 36. It also includes a pair of pick openings 38 suitable for receiving a blade-type pick 40 which enters the cassette at an angle as illustrated in FIG. 2. While the drawings illustrate a pair of openings 38, it is contemplated that a single opening may be satisfactory or a number of openings greater than two may be desirable. All are within the inventive concept.

In its assembled condition as illustrated in FIG. 1 and perhaps best seen in FIG. 3, when the cassette is removed from its package and before it is inserted into a camera, it includes a dark slide 42 extending from an egress opening 44 in the leading end wall 28 of the cassette, across the cassette to cover exposure opening 38 and a trailing tab projecting from the trailing end of the cassette through a retraction slot 46. It will be observed in FIGS. 2 and 4 that egress opening 44 is formed between an upper edge of leading end wall 28 on body 20 and the leading edge of forward wall 34 on cover 12.

Dark slide 42 covers the unexposed negative film units or sheets 48 to prevent their premature exposure. Film units 48 and dark slide 42 are biased toward forward wall 34 by a spring platen 50. Platen 50 is a spider-like element having four downwardly extending legs 52 for engaging a rear wall 54 of the cassette 10.

Because negative film units 48 are thin and fairly flexible, spring platen 50 has a special structure for holding them in place. Preferably, the legs 52 are struck from a relatively flat piece of spring steel or the like and urge the generally planar upper surface 56 of the platen 50 into engagement with the lower side of the film units 48 to hold them in place. A plurality of transversely extending grooves 58, 60, 62, and 64 are formed in the planar surface 56 either extending upwardly or downwardly from the surface to provide structural reinforcement to minimize distortion.

The leading end of platen 50 includes a shelf or support 66 to engage the leading ends of negative film units 48 to bias them into position to be expelled through egress opening 44 following their exposure.

Body 20 includes a number of structural features of significance which are important to solving the problem of accidental displacement or discharge of film units due to impacts on the cassette 10. One such feature is a rigid location post 68 of a generally chevron shaped configuration. As shown, its upper surface 70 is sloped slightly downward toward trailing end wall 26. The purpose of the sloped surface 70 is to facilitate the discharge of exposed film units through the egress opening 44 by pick 40 after their exposure. The angle of inclination of top surface 70 may be substantially greater than is illustrated.

Transversely extending ridges 72, 74, 76 and 78 formed as a part of rear wall 54 serve two functions, they increase the structural strength of rear wall 54 and they serve as a barrier against longitudinal slippage by platen 50 when assembled in proper condition, perhaps best seen in FIG. 4.

A third structural feature for maintaining the film units 48 against accidental displacement comprises a pair of flexible posts 80, 82 being located near the intersections of the trailing end wall and the two sidewalls. Posts 80, 82 project upward from the rear end wall past platen 50 through openings 84, 86 in the trailing paper border of film units 48. The upper ends of posts 80, 82 project into apertures 88, 90, respectively, in a spacer bar 92.

At this point, attention is called to FIG. 3. The spacer bar 92 as illustrated is out of sequence in the assembly of the cassette 10. It is in fact located between film units 48 and dark slide 42 as illustrated in FIGS. 4 and 5. It is shown above dark slide 42 in FIG. 3 for the reason that its illustrated structure is easier to see.

In assembling the cassette 10, the platen 50 is first assembled on body 20 by compressing it so that the legs 52 flex and slots 94 therein slide over pegs 96 which project upwardly from rear wall 54 in body 20. As the spring platen 50 is compressed, slots 94 snap into place over pegs 96 and thereafter collectively maintain the platen legs 52 in tension and thereby minimize any displacement of platen 50 with respect to body 20 due to gravity or impacts. As best illustrated in FIG. 4, ridges 72–78 assist in maintaining platen 50 properly aligned in the cassette 10.

As the film units 48 are assembled, they press against the upper surface 56 of the platen 50 and location post 68 passes upward through an opening 98 in the platen 50 which assists in maintaining it in position.

Secured to the leading end of film units 48 is a paper leader 100 having a central aperture 102. Note that leader 100 is folded back upon itself and preferably adhesively secured at its side edges to form a pocket 104 to receive the ejection pick 40 after the negative film unit has been exposed.

Spacer bar 92 fits over the trailing end of the film units and over posts 80, 82. This locks the film units in place on posts 80, 82 because of the openings 84, 86 therethrough. In order to overcome this locking feature, pick 40 must engage pocket 104 with sufficient longitudinal force as to tear the paper at openings 84, 86 in the trailing end of film units 48. FIG. 5 illustrates the thin bellows-like support 106 for hold-back posts 80, 82. The thin support 106 allows flexing of posts 80, 82 upon impact so premature tearing through openings 84, 86 is minimized. The degree of post flexing is minimized by spacer bar 92 and notches or grooves 108 at each side wall 22, 24. The grooves 108 limit longitudinal flexing of posts 80, 82 so that impacts do not allow openings 84, 86 to rise up and over the posts.

An additional retaining feature for film units 48 is illustrated in dark slide 42, namely, folded tabs 110 at its forward-most end further minimize the possibility of inadvertent discharge by being folded into the cassette between forward wall 28 and the leading end of film units 48. Note the corresponding cutouts 111 at the opposite end of dark slide 42.

Openings 112, 114 and 116 are formed in dark slide 42 to accommodate location post 68 and hold-back posts 80, 82 to allow upward and downward movement but as seen in FIGS. 4 and 5 the dark slide is not normally sufficiently depressed as to fit over any of these location features.

One additional feature in the film cassette of this invention is a pair of aligned holes 118, 120 in the cover 12 and the body 20, respectively. These elements serve as openings for an optical sensor system mounted in the camera to signal that the last film unit in the cassette has been exposed and discharged. An aligned hole 122 is formed in spring platen 50 as a part of the system.

It will be apparent to those skilled in the art from the foregoing description of this invention that various improvements and modifications may be made in it without departing from its true scope. The embodiments described herein are merely illustrative and therefore should not be viewed as the only embodiments that might encompass this invention.

We claim:

1. A cassette for holding a negative film unit, said cassette including a forward wall, a rear wall, two side walls, a leading end wall and a trailing end wall combined to form an enclosure for holding at least one film unit, comprising:

an exposure opening in said forward wall;

an egress opening in said leading end wall;

a spring platen mounted within said enclosure having legs for engaging said rear wall and for urging said film unit toward said forward wall;

a pick slot extending through said forward wall into said enclosure for the passage of a pick to advance said film unit through said egress opening, said pick slot being located intermediate said exposure opening and said egress opening; and, an optical sensor opening in said rear wall aligned with said optical sensor opening in said forward wall.

2. The cassette of claim 1 including a plurality of locking pegs projecting from said rear wall through openings in some of said legs of said spring platen, said pegs being so configured in relation to said openings in said platen legs as to place said legs in tension and thereby secure said platen and cassette rear wall together and prevent their separation by gravity or impact.

3. The cassette of claim 1 including an optical sensor opening in said rear wall aligned with said optical sensor opening in said forward wall.

4. The cassette of claim 3 including a dark slide mounted in said enclosure intermediate said film unit and said forward wall, a tab integral with said dark slide projecting from a retraction slot in said trailing end wall to allow retraction of said dark slide from said cassette.

5. The cassette of claim 4 wherein said dark slide includes a folded tab extending between said cassette trailing end wall and the leading end of said film unit to prevent impact expulsion of said film unit through said egress opening.

6. The cassette of claim 5 including a pair of hold-back pins projecting from said rear wall toward said forward wall and through apertures in said film unit, said pins being located near the intersections of said trailing end wall and said two side walls.

7. The cassette of claim 6 including a spacer bar extending across said chamber between said side walls, a hole in each end of said bar, each pin extending through a hole in said bar.

8. The cassette of claim 7 including spacer bar notches at each side wall for limiting the deflection of said bar and said pins in a direction toward said leading end wall.

9. The cassette of claim 8 including a plurality of locking pegs projecting from said rear wall through openings in some of said legs of said spring platen, said pegs being so configured in relation to said openings in said platen legs as to place said legs in tension and thereby secure said platen and cassette rear wall together and prevent their separation by gravity or impact.

10. The cassette of claim 9 including a locator post projecting from said rear wall through a slot in said film unit and said dark slide to prevent discharge of said film unit through said egress opening due to impact on said cassette.

11. The cassette of claim 10 wherein said locator post is located about equidistant between said side walls and intermediate said leading end wall and said exposure opening.

12. The cassette of claim 11 wherein said locator post is chevron shaped and diverging toward said leading end wall.

13. The cassette of claim 12 wherein said locator post terminates in a top short of said forward wall, said top sloping from said rear wall toward said forward wall and toward said leading end wall.

14. The cassette of claim 1 including a dark slide mounted in said chamber intermediate said film unit and said forward wall, a trailing tab integral with said dark slide projecting from a retraction slot in said trailing end wall to allow retraction of said dark slide from said cassette.

15. The cassette of claim 14 wherein said dark slide includes a folded tab extending between said cassette trailing end wall and the leading end of said film unit to prevent impact expulsion of said film unit through said egress opening.

16. The cassette of claim 1 including a dark slide mounted in said chamber intermediate said film unit and said forward wall, said dark slide including a folded tab extending between said cassette trailing end wall and the leading end of said film unit to prevent impact expulsion of said film unit through said egress opening.

17. The cassette of claim 1 including a locator post projecting from said rear wall through a slot in said film unit and said dark slide to prevent discharge of said film unit through said egress opening due to impact on said cassette.

18. The cassette of claim 17 wherein said locator post is located about equidistant between said side walls and intermediate said leading end wall and said exposure opening.

19. The cassette of claim 18 wherein said locator post is chevron shaped and diverging toward said leading end wall.

20. The cassette of claim 19 wherein said locator post terminates in a top short of said forward wall, said top sloping from said rear wall toward said forward wall and toward said leading end wall.

21. A cassette for holding a negative film unit, said cassette including a forward wall, a rear wall, two side walls, a leading end wall and a trailing end wall combined to form an enclosure for holding at least one film unit, comprising:

an exposure opening in said forward wall;

an egress opening in said leading end wall;

a spring platen mounted within said enclosure having legs for engaging said rear wall and for urging said film unit toward said forward wall;

a pick slot extending through said forward wall into said enclosure for the passage of a pick to advance said film unit through said egress opening, said pick slot being located intermediate said exposure opening and said egress opening;

including a pair of hold-back pins projecting from rear wall toward said forward wall and through apertures in said film unit, said pins being located near the intersections of said trailing end wall and said two side walls; and, including a spacer bar extending across said chamber between said side walls, a hole in each end of said bar, each pin extending through a hole in said bar.

22. The cassette of claim 21 including spacer bar notches at each side wall for limiting the deflection of said bar and said pins in a direction toward said leading end wall.

23. A cassette for holding a film unit, said cassette including a forward wall, a rear wall, two side walls, a leading end wall and a trailing end wall combined to form an enclosure for holding at least one film unit, an exposure opening in said forward wall, an egress opening in said leading end wall, a spring platen mounted within said chamber having legs for engaging said rear wall and other legs for urging said film unit toward said forward wall, and a plurality of locking pegs projecting from said rear wall through openings in some of said legs of said spring platen, said pegs being so configured in relation to said openings in said platen legs as to place said legs in tension and thereby secure said platen and cassette rear wall together and prevent their separation by gravity or impact, said platen including a support for said film unit adjacent said egress opening for biasing said unit into position for ejection from said cassette.

* * * * *